Sept. 8, 1953  J. E. HAMMARSTRÖM  2,651,341
BOW SAW
Filed May 11, 1951  2 Sheets-Sheet 1
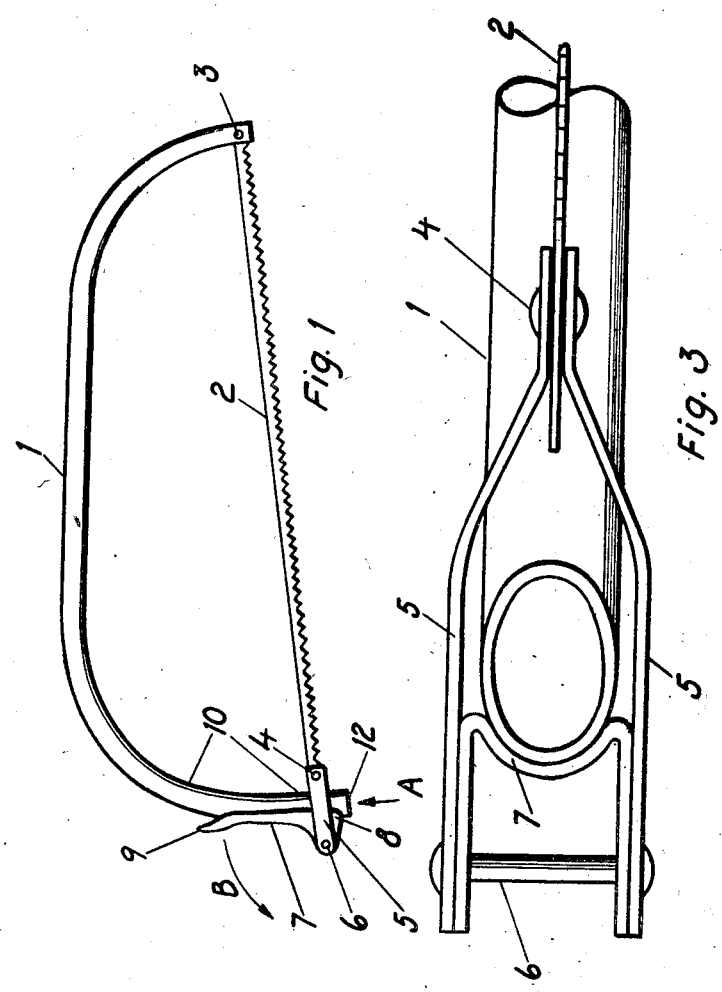
Inventor:
Johan Evert Hammarström,
By: Pierce, Scheffler & Parker,
Attorneys.

Sept. 8, 1953     J. E. HAMMARSTRÖM     2,651,341
BOW SAW
Filed May 11, 1951     2 Sheets-Sheet 2
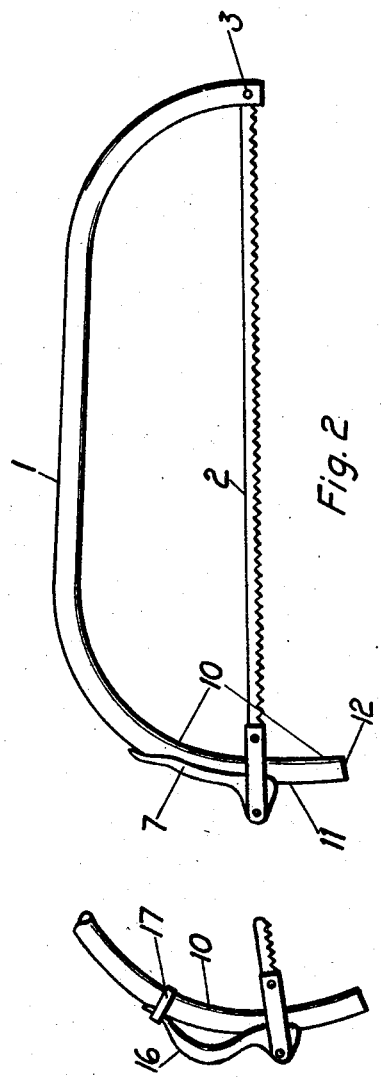
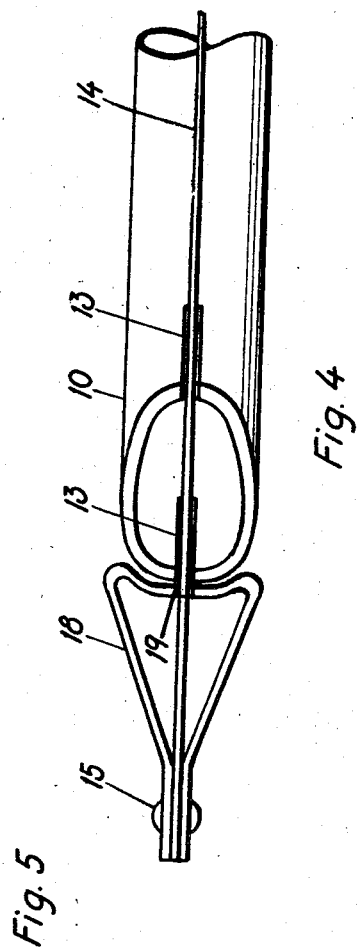
Inventor:
Johan Evert Hammarström,
By: Pierce, Scheffler & Parker,
Attorneys.

Patented Sept. 8, 1953

2,651,341

UNITED STATES PATENT OFFICE 2,651,341

BOW SAW

Johan Evert Hammarström, Sandviken, Sweden, assignor to Sandvikens Jernverks Aktiebolag, Sandviken, Sweden Application May 11, 1951, Serial No. 225,719
In Sweden March 15, 1949

3 Claims. (Cl. 145—33)

The present invention relates to the type of saws which are called bow saws.

Such saws nowadays usually consist of bent steel tubes between the ends of which a saw blade is resiliently tensioned by means of a tensioning or locking device. In order to facilitate special sawing operations it has been proposed to provide the bow saws with a handle situated under the saw blade and secured to either one of the bow ends. However, this handle may be an obstacle, e. g. when a log lying on the ground is to be sawn in two, because the handle is likely to strike the ground before the work is finished. With a view to obviating this disadvantage saws with detachable handles have been proposed. However, these saws are also attended with drawbacks consisting in that the detachable handles are likely to work loose. Further, it happens readily that an occasionally detached handle is lost.

The principal object of the present invention is to eliminate the above-mentioned drawbacks by providing a bow or frame a portion of which has the form of a part of a circle in the centre of which is situated a point of attachment for one end of a saw blade. The said portion forms one end portion of the bow while the centre of the circle lies at the other end portion of the bow, whereby the other end of the saw blade which is connected to a tensioning and fixing device adjustable along the arched portion may be fixed in arbitrary positions along this portion. It is thus possible to place the tensioning device in such positions that the saw has a handle under the saw blade or has not. In the last-mentioned case the height of the bow is considerably greater than in the first-mentioned case.

The invention is more fully described in the following specification and illustrated in the accompanying drawings, in which:

Fig. 1 is a side view of a bow saw according to the invention.

Fig. 2 is another side view of the bow saw illustrating the saw blade placed in another position relative to the bow.

Fig. 3 is a fragmentary view of a tensioning device seen in the direction indicated by the arrow A in Fig. 1.

Fig. 4 is a fragmentary view, seen from below, of a tensioning device of another embodiment of the invention, and Fig. 5 is a view of a tensioning device with a tensioning lever having the form of a separate handle.

Like parts are generally designated with like reference numbers in the figures.

In Fig. 1 the reference numbers 1 and 2 designate a bow and a saw blade respectively of a bow saw. The saw blade is at 3 pivotally connected to one end of the bow and at 4 likewise pivotally connected to members 5 of a tensioning device. The cross-section of the bow 1 is suitably that of a tube and preferably oval, in order to give the required stiffness. The members 5, situated on both sides of the bow 1, are by means of a bolt 6 pivotally connected to a tensioning lever 7 of an eccentric type which in the position shown retains the saw blade 2 firmly tensioned in the bow 1. The friction between the tensioning device and the bow prevents the tensioning device from gliding along the bow. A projection 8 on the lever 7 serves to lock the lever and thus the whole tensioning device in the position in which the bow and the saw are under tension. The lever 7 has a form which, as will be apparent from Fig. 3, in the locking position corresponds to and partly embraces the tube 1. The lever is further provided with a projection 9 which facilitates its operation when the tensioning device is to be released.

According to the invention the arched end portion 10 of the saw bow has the form of a part of a circle whose centre is situated at the point of attachment of one end of the saw blade. Hereby it is possible to adjust the tensioning device along the portion 10 and fix it in arbitrary positions. Such a position is illustrated in Fig. 2, and it will be understood that the part 11 of the portion 10 may be used as a handle. In the position shown the saw blade is substantially parallel to the straight middle portion of the bow.

Since the bow 1 always settles somewhat when the saw blade is being tensioned the portion 10 may advantageously have such a form that the distance between the point of attachment 3 of the saw blade and the outmost end 12 of the portion 10 is slightly longer than the distance between the said point and the inner part of the portion.

In the embodiment shown in Fig. 4 slots 13 are formed in the portion 10. Through the slots extends a saw blade 14 which at 15 is pivotally connected to a slotted eccentric tensioning device 18 of a type similar to that described in connection with Figs. 1-3. The slots in the portion 10 have a length which is sufficient in order to allow any desired length of the handle. The slots of the portion 10 may be closed or open.

As will be clear from Fig. 5 the lever of the tensioning device may form a separate handle 16. In order to prevent accidental release of the tensioning device due to any force executed on the handle 16 during the sawing operation a locking ring 17 or the like may be placed on the bow and the end of the handle so as to lock the handle to the bow.

In various embodiments the side of the bow on which the lever 7 is adapted to press may be flattened or provided with serrations or the like in order to obtain firm engagement with corresponding projections formed on the tensioning device.

It is to be understood that the invention is not limited to the embodiments described and shown here since other embodiments are possible within the scope of the appending claims.

Having now described my invention, what I claim as new and desire to secure by Letters Patent is:

1. In a bow saw, the combination comprising a bow, means at one end of said bow for pivotally anchoring one end of a saw blade, the other end of said bow including an arcuate portion having a center of curvature located substantially coincident with the pivot axis for the blade at the opposite end, and an eccentrically acting tensioning and locking device for securing the other end of said saw blade against said bow, the eccentric member of said device including a handle portion and an eccentric portion operated thereby and engageable with the outer face of said arcuate portion to effect the locking action and being adjustable therealong so as to enable fixing of the saw blade at different angular positions relative to said bow.

2. A bow saw as defined in claim 1 wherein the handle portion of said eccentric member includes a toe portion adapted to lie against the surface of said bow and which further includes a ring surrounding and slidable along said bow over said toe portion for locking said eccentric member against accidental displacement.

3. A bow saw as defined in claim 1 wherein the arcuate portion of said bow merges with a portion of progressively increasing radius in the direction of the bow end.

JOHAN EVERT HAMMARSTRÖM.

References Cited in the file of this patent

UNITED STATES PATENTS

| Number | Name | Date |
|---|---|---|
| 1,245,545 | Williams | Nov. 6, 1917 |
| 1,411,590 | Stenmark et al. | Apr. 4, 1922 |
| 1,484,168 | Bertas et al. | Feb. 19, 1924 |
| 2,514,880 | Leatherman | July 11, 1950 |
| 2,559,686 | Suhre | July 10, 1951 |

FOREIGN PATENTS

| Number | Country | Date |
|---|---|---|
| 39,090 | Norway | June 16, 1924 |
| 214,959 | Switzerland | Aug. 16, 1941 |